(12) United States Patent
Sonon et al.

(10) Patent No.: US 7,993,088 B2
(45) Date of Patent: Aug. 9, 2011

(54) STORAGE SYSTEM HAVING A DYNAMIC SUPPORT OF MOVING ELEMENTS AND A PUSHER ASSEMBLY CARRIED BY A FRAME

(75) Inventors: James A. Sonon, Cincinnati, OH (US); Alex W. Myers, Decatur, IN (US); Gary Van Hoagland, Ft. Wayne, IN (US)

(73) Assignee: The Kroger Co., Cincinnati, OH (US)

( * ) Notice: Subject to any disclaimer, the term of this patent is extended or adjusted under 35 U.S.C. 154(b) by 1104 days.

(21) Appl. No.: 11/076,016

(22) Filed: Mar. 9, 2005

(65) Prior Publication Data

US 2006/0204354 A1    Sep. 14, 2006

(51) Int. Cl.
*B65G 65/23*    (2006.01)
*A47F 1/04*    (2006.01)

(52) U.S. Cl. ........................................ 414/276; 211/151

(58) Field of Classification Search ................. 211/1.57, 211/126.15, 151, 59.3; 312/42, 43, 45, 61, 312/71, 128; 221/226, 279; 414/331.08, 414/331.16, 266, 267, 276
See application file for complete search history.

(56) References Cited

U.S. PATENT DOCUMENTS

| | | | |
|---|---|---|---|
| 1,702,987 A * | 2/1929 | Gordon | 211/59.3 |
| 2,098,844 A * | 11/1937 | Waxgiser | 211/59.3 |
| 2,289,807 A | 7/1942 | Schaevitz et al. | |
| 2,661,100 A | 12/1953 | Ashford | |
| 2,808,946 A | 10/1957 | Just et al. | |
| 3,001,669 A * | 9/1961 | Tandler et al. | 221/279 |
| 3,122,231 A | 2/1964 | Pence et al. | |
| 3,173,557 A | 3/1965 | Thure | |
| 3,417,879 A | 12/1968 | Bernard | |
| 3,584,750 A * | 6/1971 | Temple | 414/331.08 |
| 3,620,348 A | 11/1971 | Kursinczky | |
| 3,744,621 A | 7/1973 | Adams et al. | |
| 4,385,859 A | 5/1983 | Goossens | |
| 4,729,481 A * | 3/1988 | Hawkinson et al. | 211/59.3 |
| 5,115,907 A | 5/1992 | Pomara, Jr. | |
| 5,119,945 A * | 6/1992 | Wiggins | 211/59.2 |
| 5,141,382 A | 8/1992 | Naumanen | |
| D330,121 S | 10/1992 | Wear et al. | |
| 5,469,976 A * | 11/1995 | Burchell | 211/59.3 |
| 5,553,738 A | 9/1996 | Roselli | |
| 5,791,511 A | 8/1998 | Lowing | |
| 5,810,154 A | 9/1998 | Brouwer et al. | |
| 5,813,568 A | 9/1998 | Lowing | |
| 6,035,973 A | 3/2000 | Neal et al. | |
| 6,082,580 A | 7/2000 | Mueller et al. | |
| 6,132,158 A * | 10/2000 | Pfeiffer et al. | 414/276 |
| 6,155,438 A | 12/2000 | Close | |
| 6,357,985 B1 | 3/2002 | Anzani et al. | |
| 6,719,151 B2 | 4/2004 | Close | |
| 6,843,632 B1 | 1/2005 | Hollander | |
| 6,877,943 B2 | 4/2005 | Lehrieder et al. | |

(Continued)

*Primary Examiner* — Michael Safavi
(74) *Attorney, Agent, or Firm* — Pillsbury Winthrop Shaw Pittman LLP

(57) ABSTRACT

A storage system for storing products is provided that includes a frame having a first side and a second side opposite the first side and a dynamic support carried by the frame. A mover assembly is carried by the frame and is configured to engage an area of a product at rest on the dynamic support. The mover assembly moves the product along the dynamic support relative to the frame from a first location near the first side to a second location near the second side.

14 Claims, 8 Drawing Sheets

U.S. PATENT DOCUMENTS

| | | |
|---|---|---|
| 7,101,138 B2 | 9/2006 | Fosnight et al. |
| 2004/0065630 A1 | 4/2004 | Ondrasik |
| 2004/0140279 A1 | 7/2004 | Mueller et al. |
| 2004/0140317 A1* | 7/2004 | Forte .............................. 221/123 |
| 2006/0051187 A1 | 3/2006 | Bell |

* cited by examiner

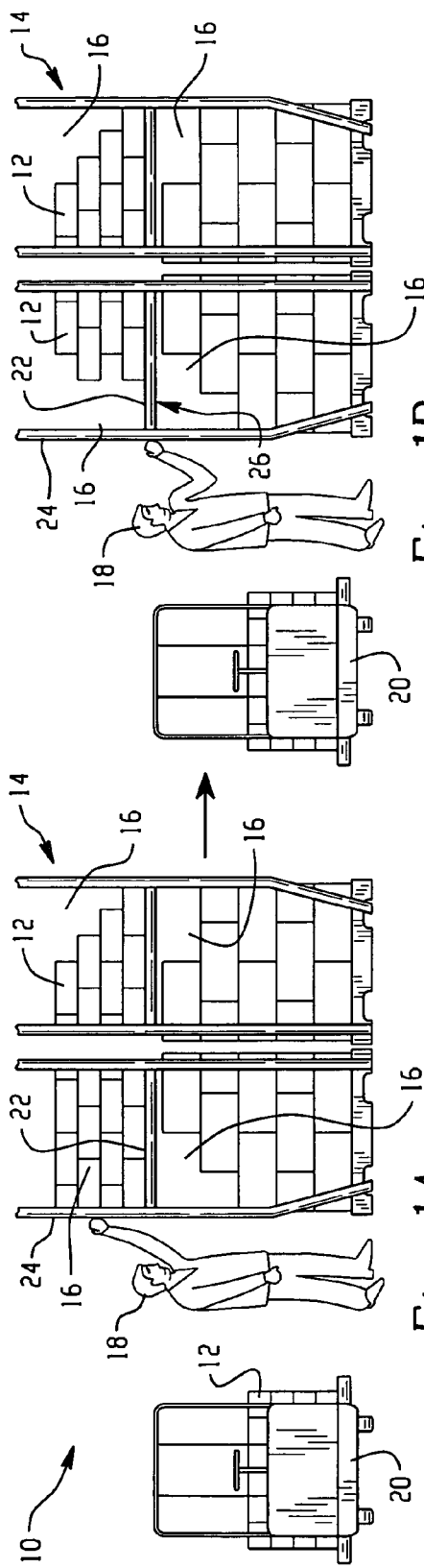
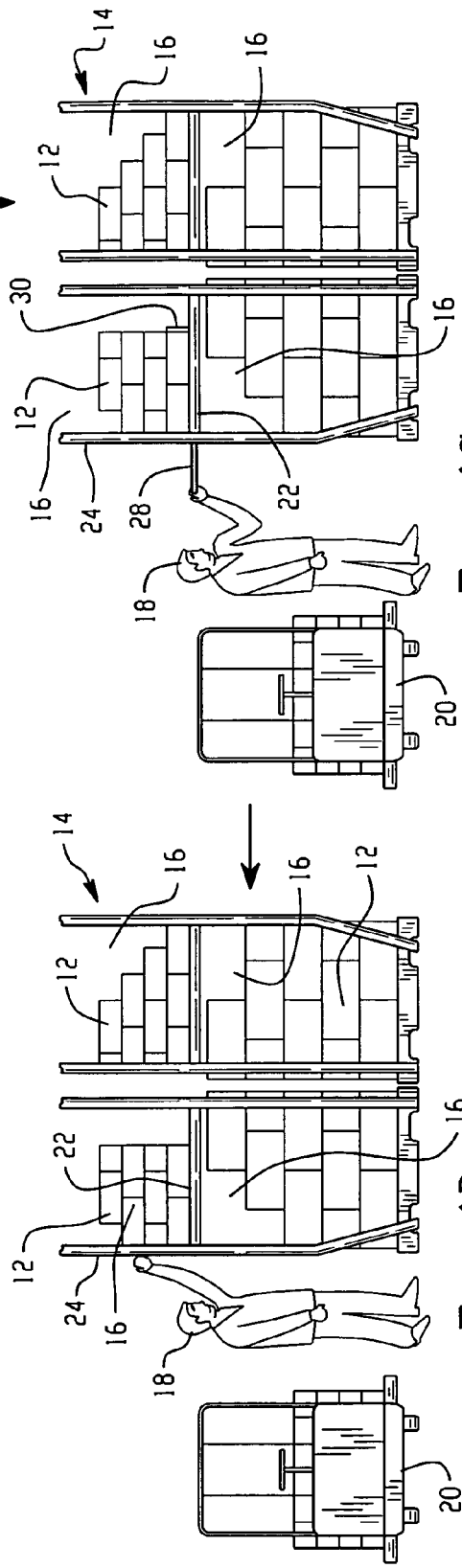

STORAGE SYSTEM HAVING A DYNAMIC SUPPORT OF MOVING ELEMENTS AND A PUSHER ASSEMBLY CARRIED BY A FRAME

TECHNICAL FIELD

The present application relates to storage systems and more particularly to a storage system capable of storing and relocating product stored therein.

BACKGROUND

It is often a goal of a product distribution process to preserve or maintain numerous products and any associated containers throughout the distribution process. The distribution process can include physical transport of containers from the product manufacturer to a point downstream of the manufacturer and products storage at one or more locations along the distribution route.

Distribution packaging refers to the packaging of product during the distribution process, for example, to aid in preserving the product while improving the efficiency of the distribution process. In some instances, the efficiency can be improved by grouping products together in groupings. A distribution package contains what is referred to herein as a unit load, which can be a collection of containers. Unit loads define the groupings whether these groupings include a singular or multiple quantities of product and any associated containers. The unit loads are maintained in a unitary state through use of the distribution package.

Frequently, at a certain stage in the distribution process prior to, for example, display of the product for consumer purchase, the products may be stored for a period of time. This is typically accomplished using a rack or shelf system where containers are stored, for example, in a three-dimensional array. The containers are then removed from the shelves and transported downstream, for example, to a retail store for consumer purchase. Relatively large storage centers can, in some instances, include thousands of containers and a wide variety of products. Typically, to retrieve a container a user must physically locate oneself within close proximity to the particular container to pick up the container and remove the container from the shelf. This retrieval operation can be repetitive, inefficient and can even lead to injury due to the added effort and strain on a user's body in manually retrieving the container.

SUMMARY

In an aspect, a storage system for storing products is provided that includes a frame having a first side and a second side opposite the first side and a dynamic support carried by the frame. A mover assembly is carried by the frame and is configured to engage an area of a product at rest on the dynamic support. The mover assembly moves the product along the dynamic support relative to the frame from a first location near the first side to a second location near the second side.

In another aspect, a unit load storage system for storing individual products packaged as unit loads prior to separating the individual products from the unit load for consumer purchase is provided. The storage system includes a frame and a mover mechanism comprising a pusher element configured to push a unit load where the mover mechanism being supported by the frame. A support member is supported by the frame and defines a support surface arranged and configured to support a unit load disposed thereon. The pusher element is configured to push a unit load along the support surface defined by the support member in a single pushing operation from a first position to a second position different from the first position.

In another aspect, a method of storing unit loads of a product using a storage system is provided. The method includes packaging individual products together to form a first unit load and packaging individual products together to form a second unit load. The products are transported as packaged in their respective first and second unit loads from a first location to a second location including the storage system for storing the first and second unit loads for a period of time. The products are placed as packaged in their respective first and second unit loads on a support surface of the storage system such that the first and second unit loads are both supported on the support surface by the storage system where the first unit load is located on the support surface at a forward position relative to the second unit load and the second unit load is located on the support surface at a rearward position relative to the first unit load. Products are removed as packaged in the first unit load from the support surface using a single lifting operation and the products as packaged in the second unit load are advanced in a direction toward the forward position along the support surface using a single pushing operation.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1A-1D illustrate a method of storing product utilizing a storage system;

DETAILED DESCRIPTION

Figure 2:
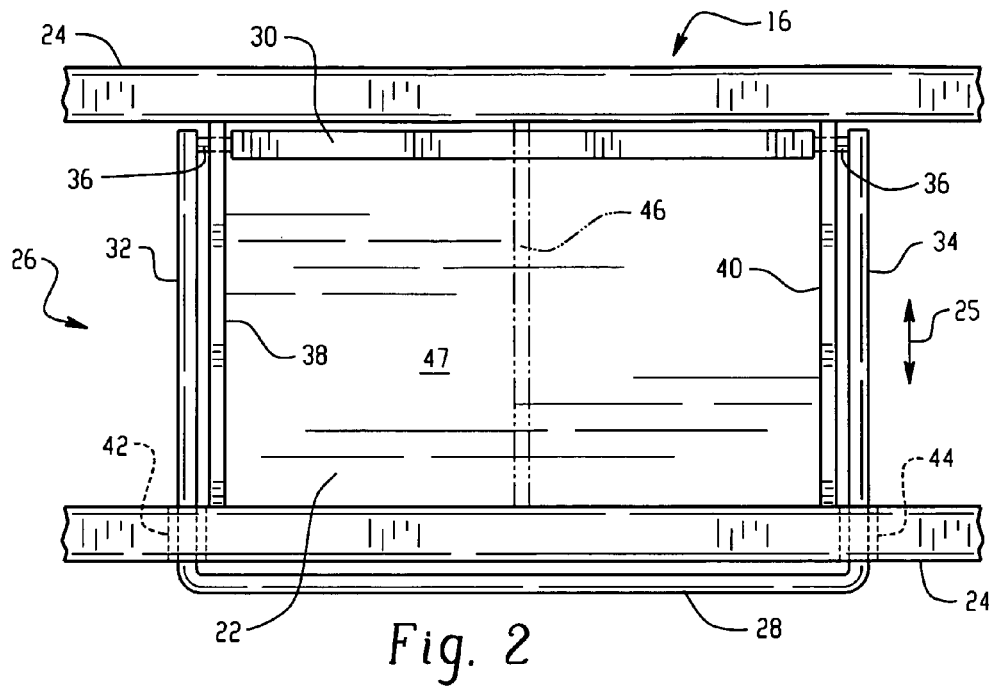
FIG. 2 is a partial, top view of an embodiment of a storage unit with a mover assembly in a rearward position.

Referring to FIGS. 1A-1D, a method 10 of storing product 12 utilizing a storage system 14 is shown. As will be described in greater detail below, the storage system 14 is capable of adjusting the location of product 12 stored therein to reduce, for example, the effort required by a user 18 to remove the product from the storage system. As used herein, the term "product" includes the product package if applicable. It should also be noted, that use of the term product is not meant to exclude the handling, transportation, storage, etc. of product as a unit load, for example, using distribution packaging.

Referring to FIG. 1A, product 12 is transported to the storage system 14 that includes multiple storage units 16 sized to receive the product. In the illustrated embodiment, the product 12 is transported by a user 18 using a vehicle 20 capable of carrying the product from a location relatively remote from the desired storage unit 16 to a location relatively near to the desired storage unit. In other embodiments, the user 18 may carry the product 12 or any other loading device may be used to transport the product such as a forklift, hand truck, etc. The product 12 is then placed at a desired location on a support member 22 (e.g., a shelf) of the desired storage unit. The product 12 is supported on the support member 22 of the storage system 14, which is, in turn, supported by frame 24.

Referring still to FIG. 1A, user 18 may remove product 12 from the storage system 14. This may be accomplished by lifting, sliding, etc. product 12 located relatively near the user 18 from the storage unit 16. The product 12 may be removed manually or by utilizing a machine, such as a forklift.

Referring to FIG. 1B, after product 12 located relatively near the user 18 is removed, product 12 remaining on the support member 22 is located relatively far (i.e., rearward) from the user. As indicated above, storage system 14 includes a mover assembly 26 (see, e.g., FIG. 2) that can be used to adjust the position of the product 12 remaining on the support member 22 by moving the product from the location relatively far from the user 18 to a location relatively near to the user (i.e., forward). Repositioning the product nearer to user 18 can reduce the amount of effort and movement (e.g., back bending, reaching, etc.) required by the user to remove the product from the storage system 14 resulting in significant ergonomic improvement.

Referring also to FIG. 1C, to adjust the position of the product 12 using the storage system 14, the user 18 grasps a graspable handle 28 and applies a pulling force thereto. As will be described in greater detail with reference to, e.g., FIGS. 2 and 3, the handle is mechanically connected to a pusher element 30 capable of engaging (or already in engagement with) an area of the product 12. By pulling the handle 28, the pusher element 30 pushes the product 12 in a direction toward the user 18. With the product 12 in the forward location as shown in FIGS. 1C and 1D, less effort is required for the user to pick up the product from the storage unit 16.

While only four storage units 16 are depicted in FIGS. 1A-1D, storage system 14 can include any number of storage units including, for example, less than four such as one or two, or more than four such as ten or more, 100 or more, 1000 or more storage units. In some embodiments, the number of storage units 16 depends on the size of the storage space (e.g., the size of a warehouse) in which the storage system 14 is housed and/or the size of the product or unit load of the product to be stored. For example, in some embodiments it may be desirable to store unit loads having a footprint of, for example, about 40 inches by 48 inches or about 30 inches by 40 inches. Additionally, while adjacent, vertically stacked pairs of storage units 16 are depicted, any suitable arrangement of storage units 16 can be employed.

Figure 3:
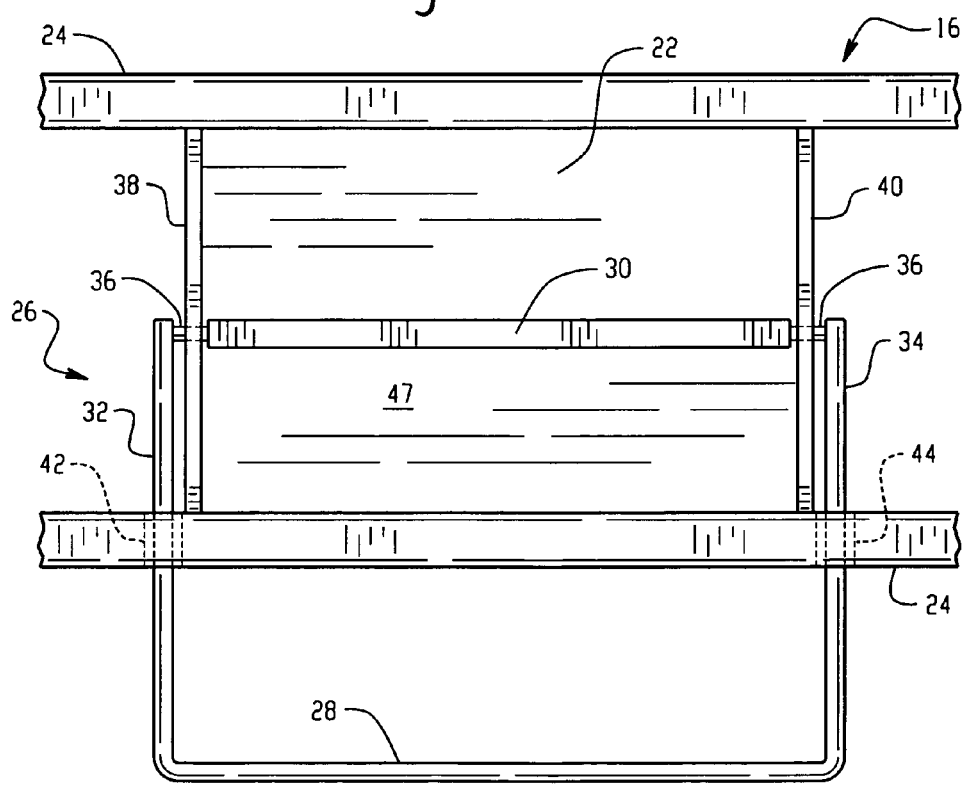
FIG. 3 is a partial, top view of the storage unit of FIG. 2 with the mover assembly in a forward position.

Referring to FIGS. 2 and 3, mover assembly 26 includes handle 28, pusher element 30 and a pair of arms 32 and 34 connecting the handle to the pusher element. Arms 32 and 34 are each connected to the pusher element 30 by a pin 36 that rides in a respective slot (not shown) formed in an associated track 38 and 40. The tracks 38 and 40 extend alongside opposite sides of support member 22 and can serve as guides by inhibiting the product 12 from sliding off of the shelf, e.g., during a moving operation. The arms 32 and 34 are slidably received by openings 42, 44 (shown by dotted lines) extending through the frame 24. Alternatively, the arms 32 and 34 may be received by connectors (not shown), such as sleeve bearings, mounted to the frame 24. Any other suitable mounting method may be employed that allows for arms to slide relative to the frame 24 in the direction of arrow 25. FIG. 2 also shows an alternative embodiment having more than two arms (e.g., third arm 46 shown by dotted lines). In some embodiments, the mover assembly has only one arm connected to the pusher element 30 (e.g., only arm 46 shown by dotted lines).

Support member 22 is mounted to frame 24 and forms a substantially planar support surface 47 on which product 12 can rest and slide along. Support member 22 can be formed of a low friction material, such as nylon, polytetrafluoroethylene (PTFE), etc., or a combination of materials including a low friction material to form a low friction support surface of the low friction material and/or the support member 22 may be coated with a low friction material, such as Teflon® or Formica® to form a low friction support surface. By forming a low friction support surface, friction between the support surface and the product 12 can be reduced during a moving operation. As an alternative to a planar support surface 47, support member 22 may include or be formed of rails, bars, beads and/or beams, e.g., having a low friction contact surface, carried by the frame 24. In these cases, the product 12 can slide along only, for example, the rail, which can reduce the contact area between the product and the support surface.

Other methods and devices can be used to facilitate movement of the product 12 being supported by storage system 14. In some embodiments, the storage system 14 includes a dynamic support upon which the product 12 rests. By dynamic support, we refer to a support capable of interacting with a load supported thereon to actively facilitate movement of the load relative to a reference, such as frame 24. The dynamic support can reduce the amount of force necessary to move a load and can enable the repositioning (e.g., manually or mechanically) of relatively heavy loads, e.g., between about less than one pound and 3000 pounds or greater or about 800 pounds or less.

Figure 4:
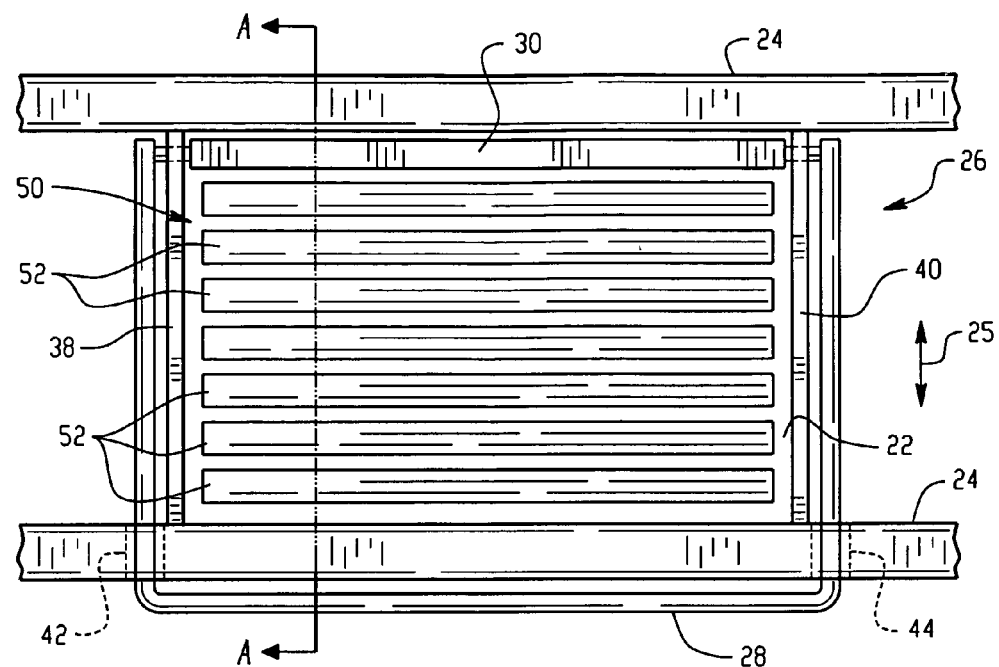
FIG. 4 is a partial, top view of an alternative embodiment of a storage unit.
Figure 4A:
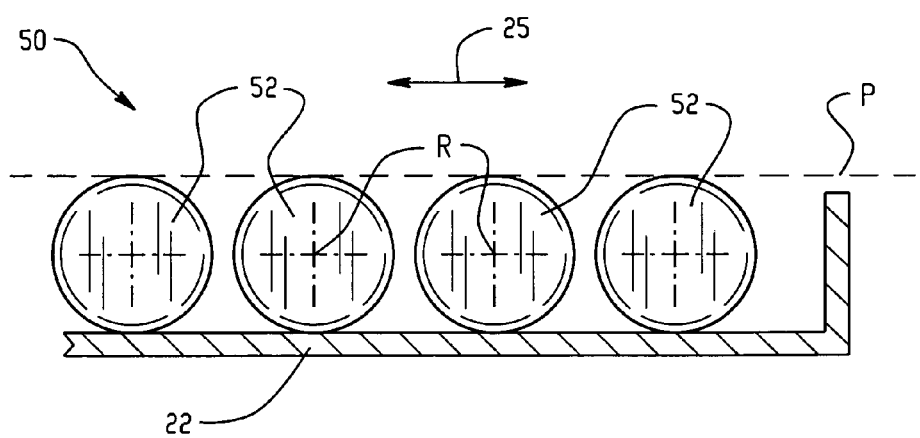
FIG. 4A is a section view of a support member along line A-A of FIG. 4.

Referring to FIGS. 4 and 4A, dynamic support 50 is formed by an array of moving elements 52 (e.g., rollers, balls, bearings, wheels, etc.) carried by support member 22 that move as the product 12 rides along the dynamic support 50. As shown, each moving element 52 has a fixed axis of rotation R (FIG. 4A) that that is oriented to facilitate front-to-back movement (i.e., in the direction of arrow 25) of the product during a moving operation using the mover assembly 26. In some embodiments, the moving elements 52 may not have a fixed axis of rotation. The moving elements 52 are aligned to form a substantially planar, dynamic support surface P along which product 12 can move. Similar to the embodiment of FIGS. 2 and 3, the mover assembly 26 moves independently of the support member 22 including dynamic support 50. In some embodiments, a single moving element may be used. For example, the support member 22 may carry a conveyor belt. Additionally, the dynamic support surface P may not be horizontal and may be diagonal to allow gravity to affect movement of product 12.

Figure 5:
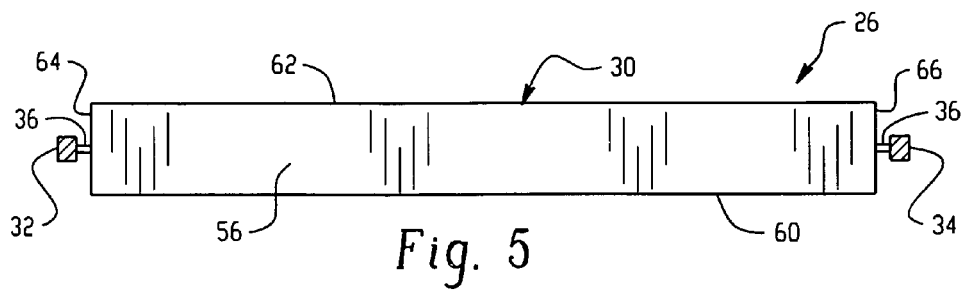
FIG. 5 is a partial, front view of the mover assembly embodiment of FIG. 2.
Figure 5A:
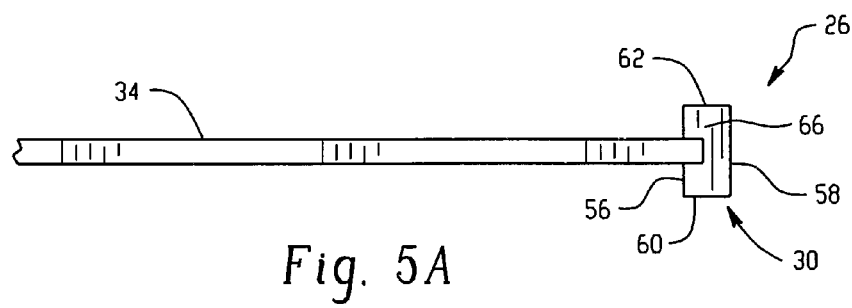
FIG. 5A is a partial, side view of the mover assembly of FIG. 5.
Figure 6:
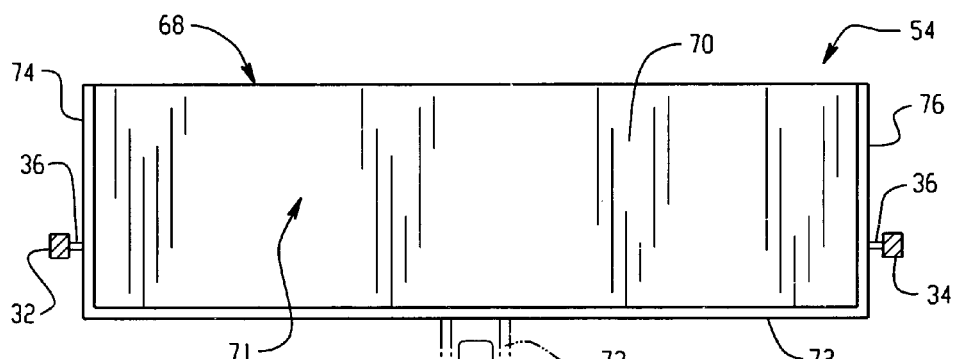
FIG. 6 is a partial, front view of another embodiment of a mover assembly.
Figure 6A:
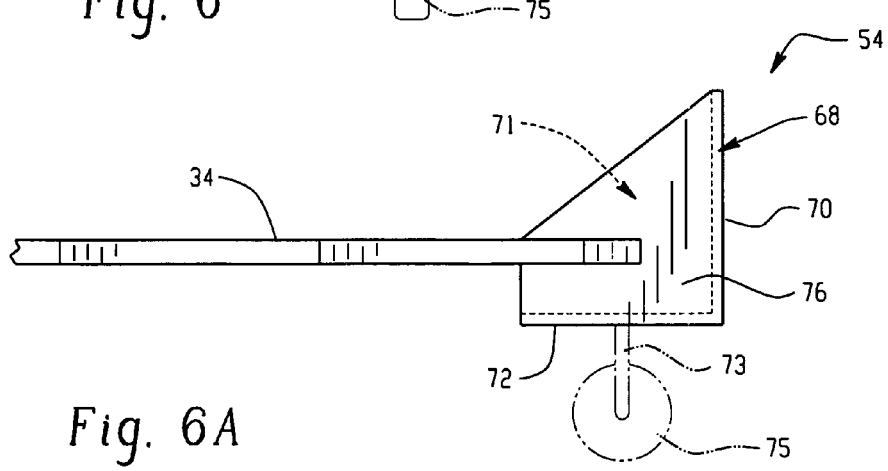
FIG. 6A is a partial, side view of the mover assembly embodiment of FIG. 6.

Referring now to FIGS. 5-6A, two mover assembly examples 26 and 54 are shown. Referring first to FIGS. 5 and 5A, mover assembly 26 includes a parallelepiped-shaped pusher element 30 connected to arms 32 and 34 by pin 36. Pusher element 30 includes a front 56, back 58, bottom 60, top 62 and opposite ends 64, 66. Front 56 engages package 12 during a moving operation.

Any other suitable mover assembly configuration can be used, such as that shown by FIGS. 6 and 6A. In this embodiment, pusher element 68 has an L-shaped cross-section (see the dotted lines of FIG. 6A) forming a cavity 71 that can receive product during a moving operation. Pusher element 68 includes a back wall 70, a bottom wall 72 and end walls 74, 76 that can be used to inhibit products 12 (see FIGS. 1A-1D) being moved from sliding off of the support member 22. Other configurations are contemplated such as cylindrical pusher elements and pusher elements having a profile matching at least a portion of the product or product package. For example, a concave pusher element may be used to move a product having a convex-shaped package. Also, the pusher element may include padding, netting or mesh, or be formed of a relatively soft, deformable material, such as an elastic rubber and/or foam to reduce the possibility of product damage.

The mover assembly can include a support 73 that can contact the support member 22 for supporting the mover assembly. In some embodiments, the support 73 includes a moveable member 75, such as a wheel or ball. Alternatively, the support may not include a moveable member. In some instances, the support may ride along a track (not shown) of the support member 22 to aid in guiding the mover assembly during a moving operation.

Figure 7:
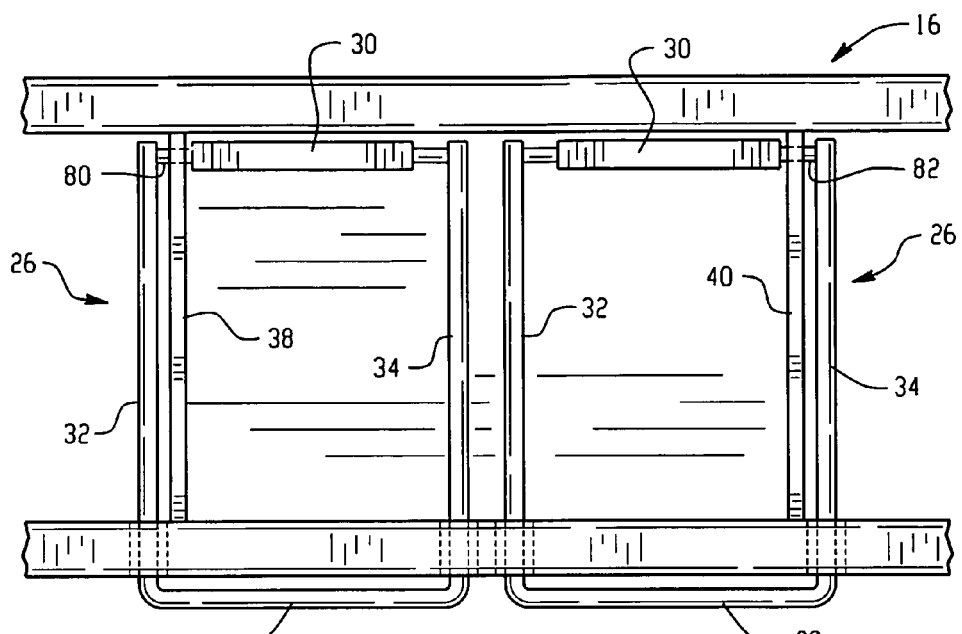
FIG. 7 is a partial, top view of another embodiment of a storage unit having multiple mover assemblies in rearward positions.
Figure 8:
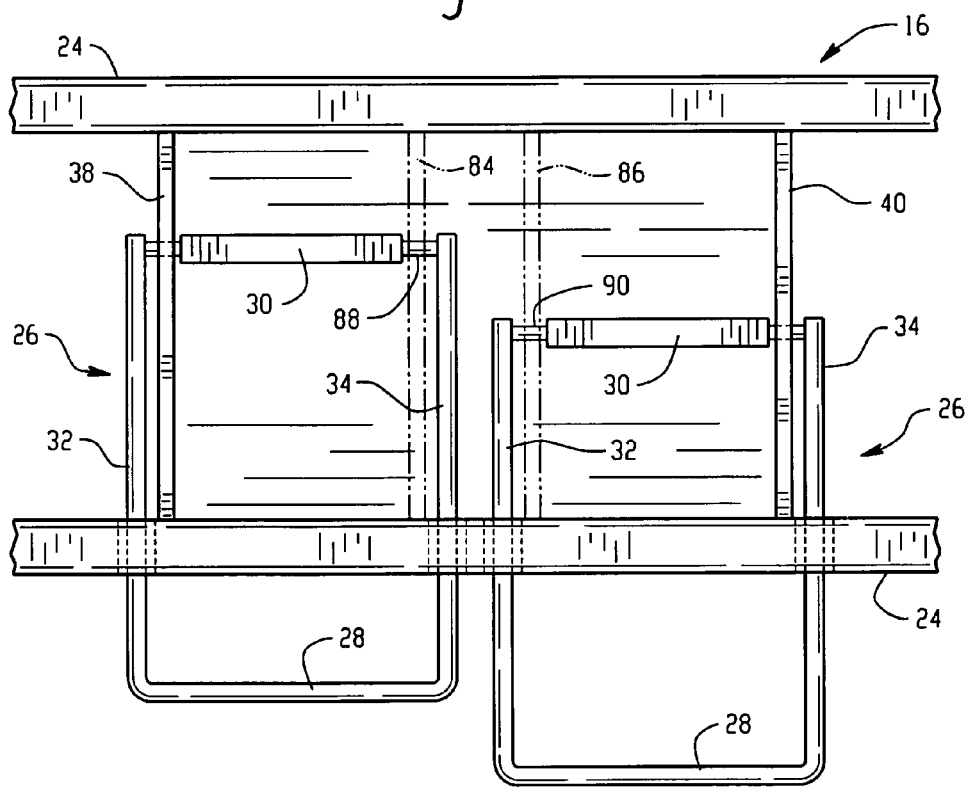
FIG. 8 is a partial, top view of the storage unit of FIG. 7 with the multiple mover assemblies in offsetting intermediate forward positions.

Referring now to FIGS. 7 and 8, a single storage unit 16 may include more than one mover assembly 26. For example, FIGS. 7 and 8 show two mover assemblies 26 and a single support member 22. Pins 80, 82 of the mover assemblies 26 ride along respective tracks 38 and 40. Referring to FIG. 8, in an alternative embodiment shown by dotted lines, tracks 84 and 86 are provided along which pins 88 and 90 can ride. In some embodiments, each storage unit 16 may include multiple support members 22 and associated one or more mover assemblies. The mover assemblies 26 can move independently of each other or they may be connected such that they move together.

Figure 9:
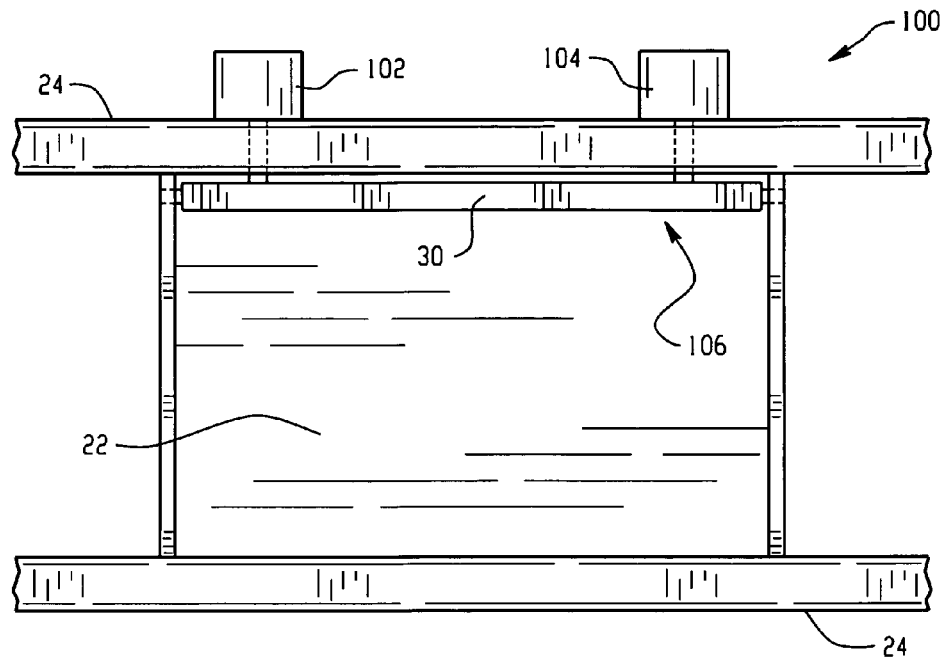
FIG. 9 is a partial, top view of another embodiment of a storage unit including an automated mover assembly.
Figure 10:
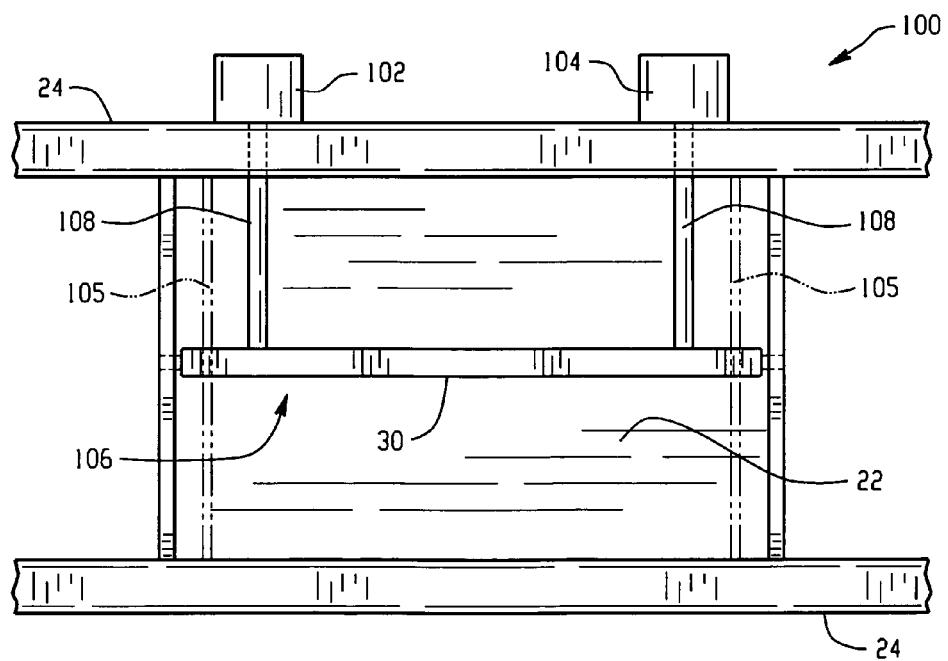
FIG. 10 is a partial, top view of the storage unit of FIG. 9 with the mover assembly in a forward position.

Referring to FIGS. 9 and 10, the moving operation may be automated as opposed to manually operated. Storage unit 100 includes mechanical devices 102, 104 that are capable of moving mover assembly 106 along with any product 12 disposed on support member 22. In other embodiments, only one or more than two mechanical devices may be used. As shown, the mechanical devices 102 and 104 are hydraulic and/or air cylinders including rodless cylinders, having output shafts 108 connected to back 58 of pusher element 30. In some embodiments, the mechanical devices may be located under support member 22.

The mechanical devices 102 and 104 may be connected to a user interface or controller, which, in turn, can be used to control the mechanical devices. A sensor, such as a motion sensor, proximity switch, light curtain, etc., may be utilized to signal actuation and initiation of a moving operation. Alternative embodiments may include one or more motors mechanically linked to the mover assembly and being capable of moving the pusher element. Other embodiments are contemplated, such as utilizing a lead screw or chain drive (both represented by dashed lines 105) to move the pusher element.

The above-described storage systems can be suitable for warehouse storage, e.g., for storing individual products and/or unit loads. The storage systems can also be suitable for point of purchase storage and display. For example, the user may be a customer and the product may be a food item such as a box of cereal. The storage systems can be sized to accommodate relatively small products such as food items packaged for consumer purchase or relatively large products, such as furniture. Furthermore, the storage system may be used, for example, as part of a manufacturing process by providing ready access to assembly parts stored therein.

The acceleration and velocity of the moving assembly can be set as desired. In some cases, for relatively fragile or delicate products, such as produce, it may be desirable to have a relatively low acceleration and/or velocity with which the pusher element contacts and moves the products, while in other cases a higher acceleration and/or velocity may be desirable.

Figure 11:
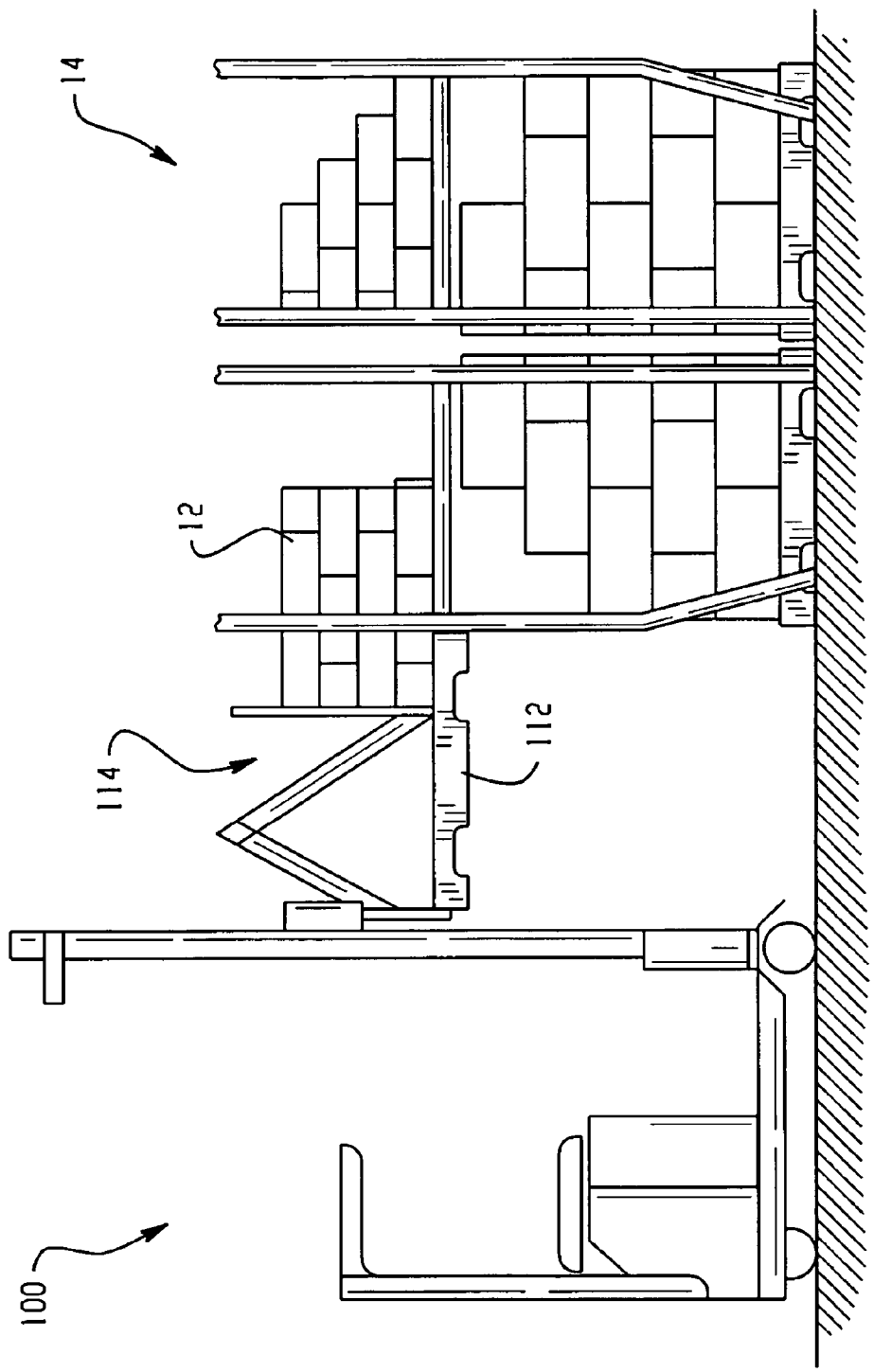
FIG. 11 illustrates an alternative apparatus including a mover assembly.

Additionally, while a storage system is primarily described above, referring to FIG. 11, the storage system mechanisms may be employed for use with other system types. FIG. 11 shows a vehicle 110 that includes a vertically moveable support member 112 and an automated a mover assembly 114 configured to move horizontally relative to the shelf 112. As above with regard to storage system 14, support member 112 may include a dynamic support, such as that formed by an array of rollers, to facilitate movement of product 12 resting thereon.

Figure 12:
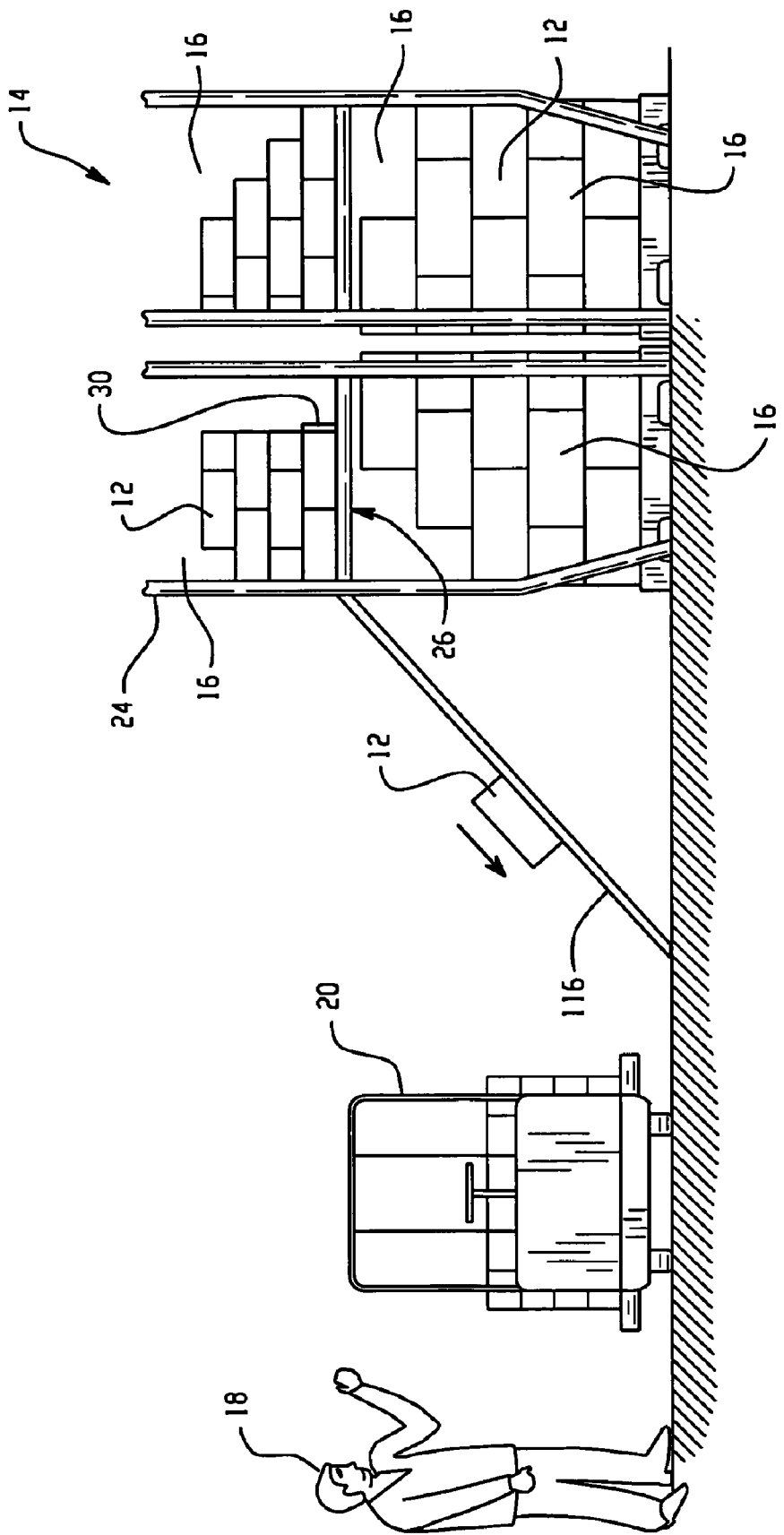
FIG. 12 illustrates an embodiment of a dispensing storage system.

A number of detailed embodiments have been described. Nevertheless, it will be understood that various modifications may be made. For example, the mover assembly may be constructed to move three-dimensionally. In some cases, it may be desirable for the pusher element to rotate about an axis of rotation, for example, to obtain proper position to engage a product. In some embodiments, the pusher may include moveable fingers capable of grasping the product (e.g., in a scissor-like fashion). As another example, some embodiments may include a mover multiplier such as a mechanical linkage connecting, with reference to FIG. 2 as an example, the graspable handle 28 and the pusher element 30. The mover multiplier causes the pusher element 30 to move a greater distance than the graspable handle 28. In some instances, the moving elements 52 may be driven, e.g., mechanically, to automatically rotate. Furthermore, combinations of the above-described features may be employed. For example, referring to FIG. 12, storage system 14 along with mover assembly 26 can be used to feed product 12 to an inclined support surface 116 where gravity is used to affect movement of the product 12 along the support surface toward the user 18. Accordingly, other embodiments are within the scope of the following claims.

What is claimed is:

1. A storage system for storing products, the storage system comprising:

a frame having a first side and a second loading/unloading side opposite the first side, the second loading/unloading side comprising a pair of spaced apart openings through the frame;

a dynamic support carried by the frame, the dynamic support configured to support a product thereon by resting the product against the dynamic support, the dynamic support including a plurality of moving elements upon which product rests to define a dynamic support surface; and a mover assembly carried by the frame and configured to engage an area of the product at rest on the dynamic support, the mover assembly comprising spaced apart tracks, each track extending alongside a respective outer edge of the dynamic support from the first side to the second side of the frame and a pusher element that is moveably coupled to the tracks for movement along the tracks between the first and second sides of the frame, the mover assembly configured to move the product along the dynamic support by moving the pusher element relative to the dynamic support and toward the second loading/unloading side thereby applying a pushing force to the rear of the product to move the product relative to the dynamic support, the dynamic support surface having lateral side edges, each of which is located between the spaced apart tracks;

wherein the mover assembly includes a graspable handle that is connected to the pusher element by a pair of spaced apart arms, each arm extending through a respective one of the openings in frame such that pulling the graspable handle away from the front portion of the frame moves the pusher element toward the second loading/unloading side of the frame.

2. The storage system of claim 1 further comprising a support member carrying the dynamic support.

3. The storage system of claim 1, wherein the mover assembly moves the product in response to input from a user.

4. The storage system of claim 1 wherein the moving elements are arranged such that top portions of the moving elements lie in a common plane.

5. The storage system of claim 4, wherein the moving elements comprise rollers, each roller having an axis of rotation that remains at a fixed location during product movement and that is substantially parallel to an axis of rotation of an adjacent roller.

6. The storage system of claim 4, wherein the moving elements are wheels or balls.

7. The storage system of claim 1 wherein the frame, dynamic support and mover assembly define at least one storage unit within the storage system, the storage unit sized to receive a unit load of product.

8. The storage system of claim 7, wherein the storage unit is sized to receive a unit load having about a 40 inch by 48 inch footprint.

9. A unit load storage system for storing individual products packaged as unit loads prior to separating the individual products from the unit load for consumer purchase, the storage system comprising:
a frame comprising a front load/unload side and a rear side;
a mover mechanism comprising:
  a pair of spaced apart tracks extending between the front side and the rear side of the frame;
  a pusher element configured to push a unit load, the pusher element moveably coupled to the tracks for movement along the tracks; and
  a graspable handle connected to the pusher element, the graspable handle located at the front load/unload side of the frame with the pusher element located at the rear side of the frame such that a user can grasp the handle with the pusher element at the rear side of the frame, the handle being connected to the pusher element such that pulling the graspable handle away from the frame moves the pusher element toward the front load/unload side of the frame;
a dynamic support member located between the pair of tracks of the mover mechanism, the support member supported by the frame and including movable members configured to support a unit load disposed thereon, the movable members having rotation axes generally perpendicular to the direction of movement of the pusher element from the rear side of the frame to the front load/unload side of the frame;
wherein the pusher element includes a back wall that extends between the pair of spaced apart tracks above the dynamic support, and wherein the back wall is configured to move relative to the dynamic support member to push a unit load along the support surface defined by the support member in a single pushing operation from a first position nearer to the rear side of the frame to a second position further from the rear side of the frame when the graspable handle is pulled away from the frame.

10. The storage system of claim 9, wherein the mover mechanism is configured to push a unit load.

11. The storage system of claim 10, wherein the mover mechanism is configured to push the unit load in response to input from a user.

12. A storage system for storing products, the storage system comprising:
a frame;
a dynamic support carried by the frame in an elevated position, the dynamic support having a front, a back and opposite sides, the dynamic support including an array of rollers, each roller having an axis arranged to facilitate movement of products from the back toward the front during roller rotation, tops of the rollers aligned to form a dynamic support surface against which products rest;
a mover assembly carried by the frame and configured to engage product on the dynamic support and to move the product along the dynamic support from back to front, the mover assembly including:
  a first track extending in a back to front direction along one side of the dynamic support;
  a second track extending in the back to front direction along the other side of the dynamic support, the second track spaced from the first track;
  a pusher movably coupled to the first and second tracks for movement along the tracks to facilitate moving product forward along the dynamic support surface, the pusher including a back wall located above the dynamic support extending from side to side completely across the dynamic support surface;
  a handle located at the front of the frame in position in front of the dynamic support;
  and at least first and second spaced apart members extending rearward from the handle to link the handle to the pusher such that pulling the handle forward from the frame causes the first and second members to move forward and thus the pusher to move forward relative to the dynamic support surface, wherein the first and second members extend through respective spaced apart openings in a front portion of the frame and the front portion of the frame remains stationary when the handle, spaced apart members and pusher are moved.

13. The storage system of claim 12 wherein:
the dynamic support surface is offset from horizontal to allow gravity to affect product movement along the dynamic support surface;
the pusher further including opposed end walls extending forward of the back wall above the dynamic support, the opposed end walls move with the back wall and are located to inhibit product from moving laterally off of the sides of the dynamic support during a product pushing operation.

14. The storage system of claim 13 wherein the first and second members comprise first and second arms.

* * * * *